United States Patent
Fukuda et al.

[11] Patent Number: 5,898,166
[45] Date of Patent: Apr. 27, 1999

[54] INFORMATION REPRODUCTION SYSTEM WHICH UTILIZES PHYSICAL INFORMATION ON AN OPTICALLY-READABLE CODE AND WHICH OPTICALLY READS THE CODE TO REPRODUCE MULTIMEDIA INFORMATION

[75] Inventors: Hiroyuki Fukuda, Hachioji; Takeshi Mori, Machida; Seiji Tatsuta, Hachioji, all of Japan

[73] Assignee: Olympus Optical Co., Ltd., Tokyo, Japan

[21] Appl. No.: 08/651,978

[22] Filed: May 21, 1996

[30] Foreign Application Priority Data

May 23, 1995 [JP] Japan ................................ 7-123790
May 15, 1996 [JP] Japan ................................ 8-120474

[51] Int. Cl.$^6$ ............................ G06K 19/06; G06K 9/38
[52] U.S. Cl. ............................ 235/494; 235/454; 371/6; 369/14
[58] Field of Search ................................ 235/462, 494, 235/454; 371/6; 369/14

[56] References Cited

U.S. PATENT DOCUMENTS

| | | | |
|---|---|---|---|
| 4,825,058 | 4/1989 | Poland | 235/472 |
| 5,042,079 | 8/1991 | Morikawa et al. | 382/58 |
| 5,189,292 | 2/1993 | Batterman et al. | 235/494 |
| 5,278,400 | 1/1994 | Appel | 235/494 |
| 5,288,986 | 2/1994 | Pine et al. | 235/494 |
| 5,308,966 | 5/1994 | Danielson et al. | 235/472 |
| 5,400,415 | 3/1995 | Kobayashi | 382/51 |
| 5,488,223 | 1/1996 | Austin et al. | 235/375 |
| 5,530,517 | 6/1996 | Patton et al. | 355/40 |
| 5,541,396 | 7/1996 | Rentsch | 235/454 |
| 5,623,479 | 4/1997 | Takahashi | 369/275.5 |
| 5,644,557 | 7/1997 | Akamine et al. | 369/14 |
| 5,692,113 | 11/1997 | Tatsuta | 395/117 |
| 5,724,364 | 3/1998 | Mori et al. | 371/6 |

FOREIGN PATENT DOCUMENTS 0670555 4/1994 European Pat. Off. .

OTHER PUBLICATIONS

Ohyama et al., Optical Sheet Memory System, Electronics and Communication in Japan, Part 2, vol. 4, Apr. 1992.

*Primary Examiner*—Anita Pellman Gross
*Assistant Examiner*—Douglas X. Rodriguez
*Attorney, Agent, or Firm*—Frishauf, Holtz, Goodman, Langer & Chick

[57] ABSTRACT

A sensing section reads the dot codes by optically scanning a recording medium on which multimedia information has been recorded in the form of optically readable dot codes. The thus obtained dot codes are processed and restored to the original multimedia information by a scanning conversion section, a data string adjusting section, an error correction section, a reproducing section and a controller. An output unit reproduces each piece of information and outputs them. In this case, on the basis of the dot codes thus read, the scanning conversion section and controller sense information reproduction parameters, such as the dot size. The sensed parameters are then stored in a parameter memory. According to the parameters stored in the parameter memory, the dot codes are then subjected to a reproducing process.

23 Claims, 14 Drawing Sheets

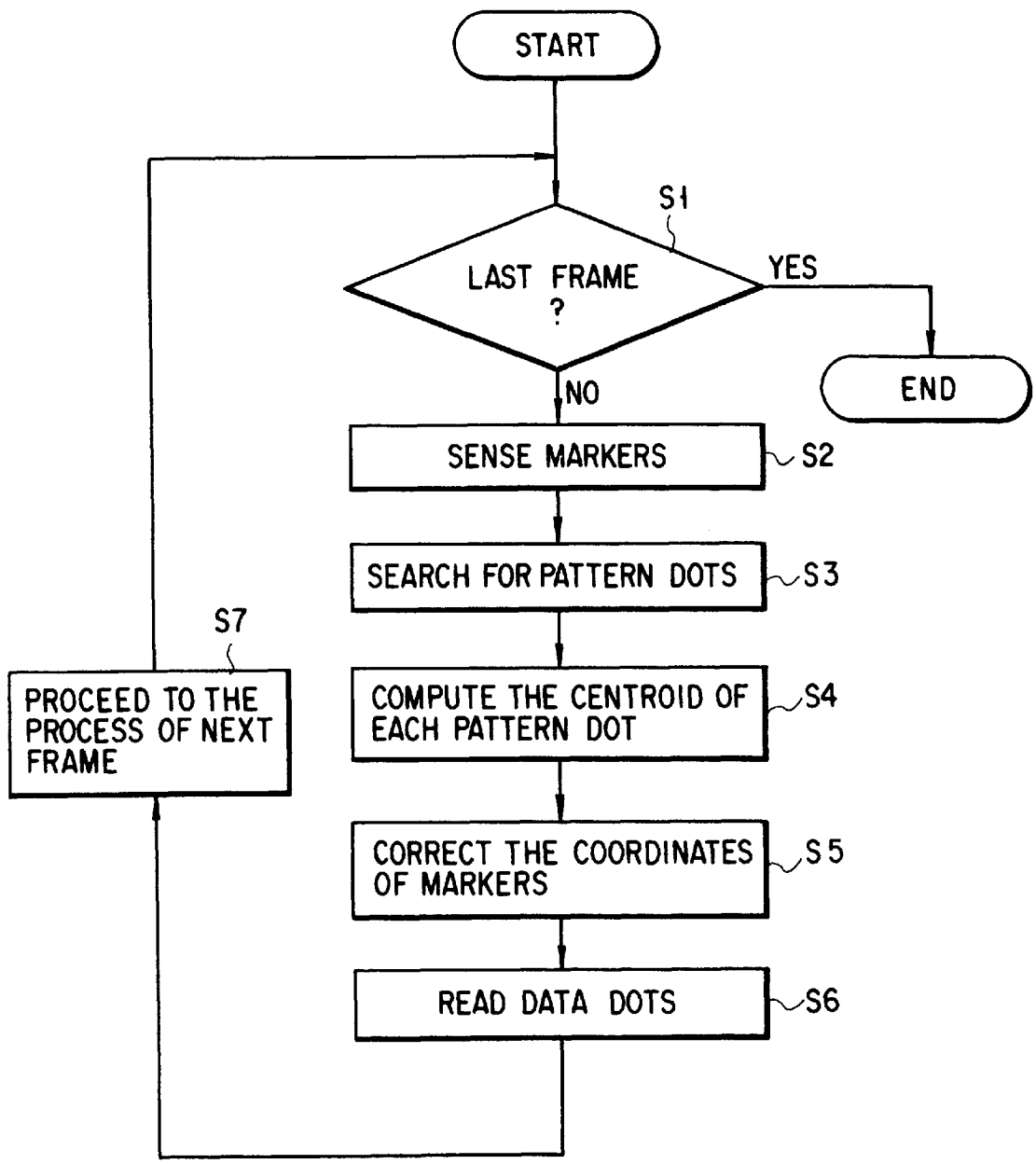
F I G. 3

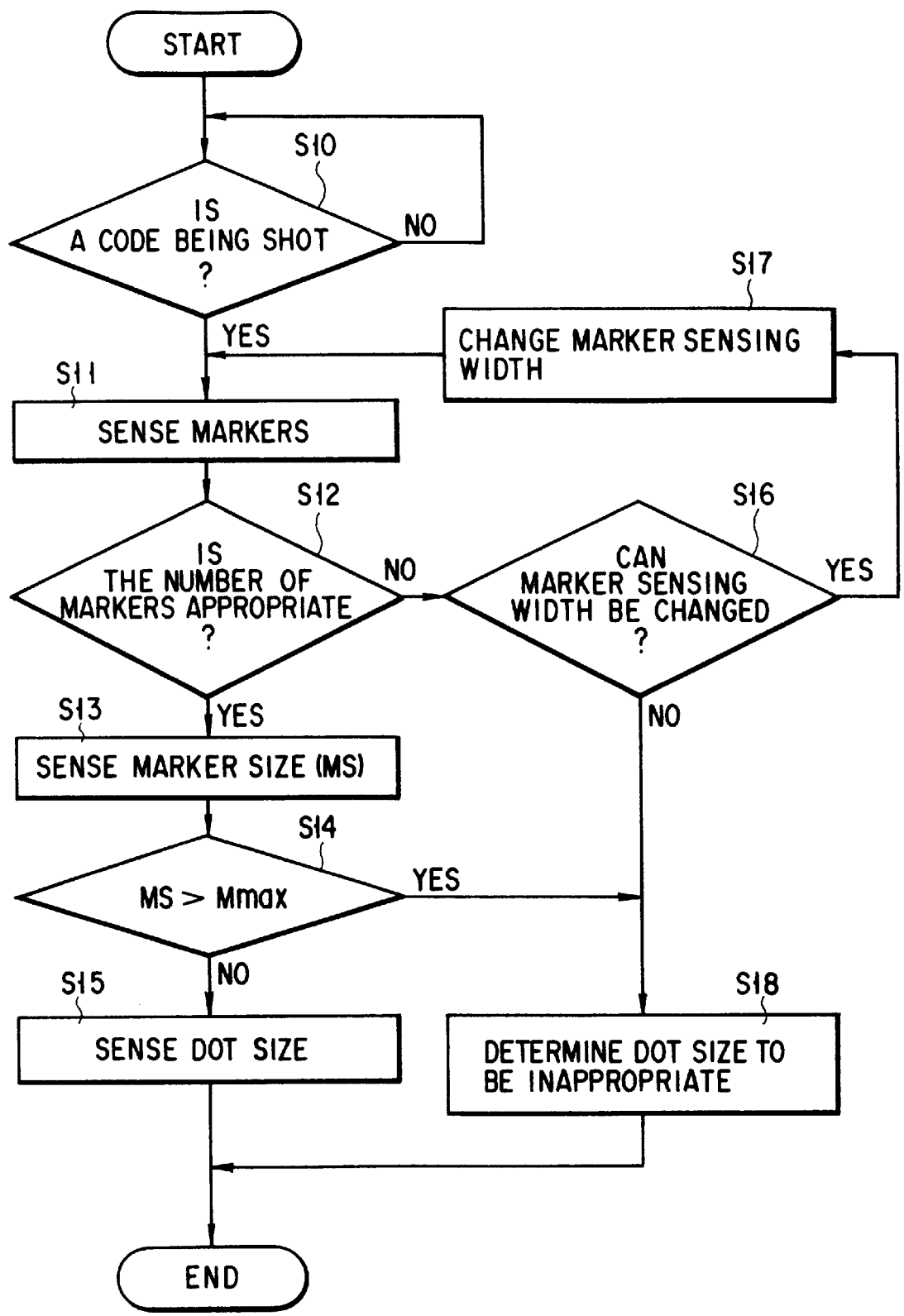
F I G. 4

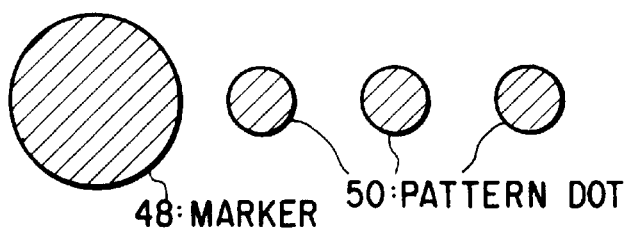
F I G. 8A
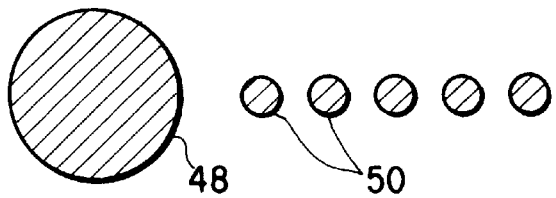
F I G. 8B
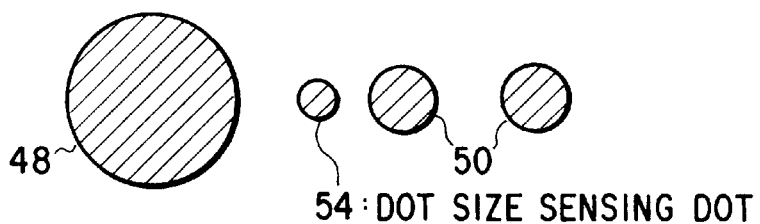
F I G. 11A
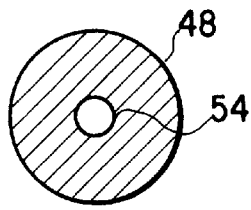
F I G. 11B
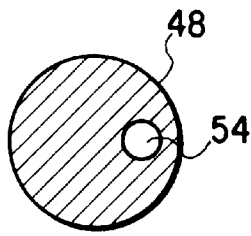
F I G. 11C
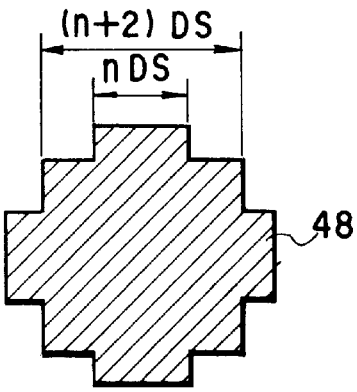
F I G. 12

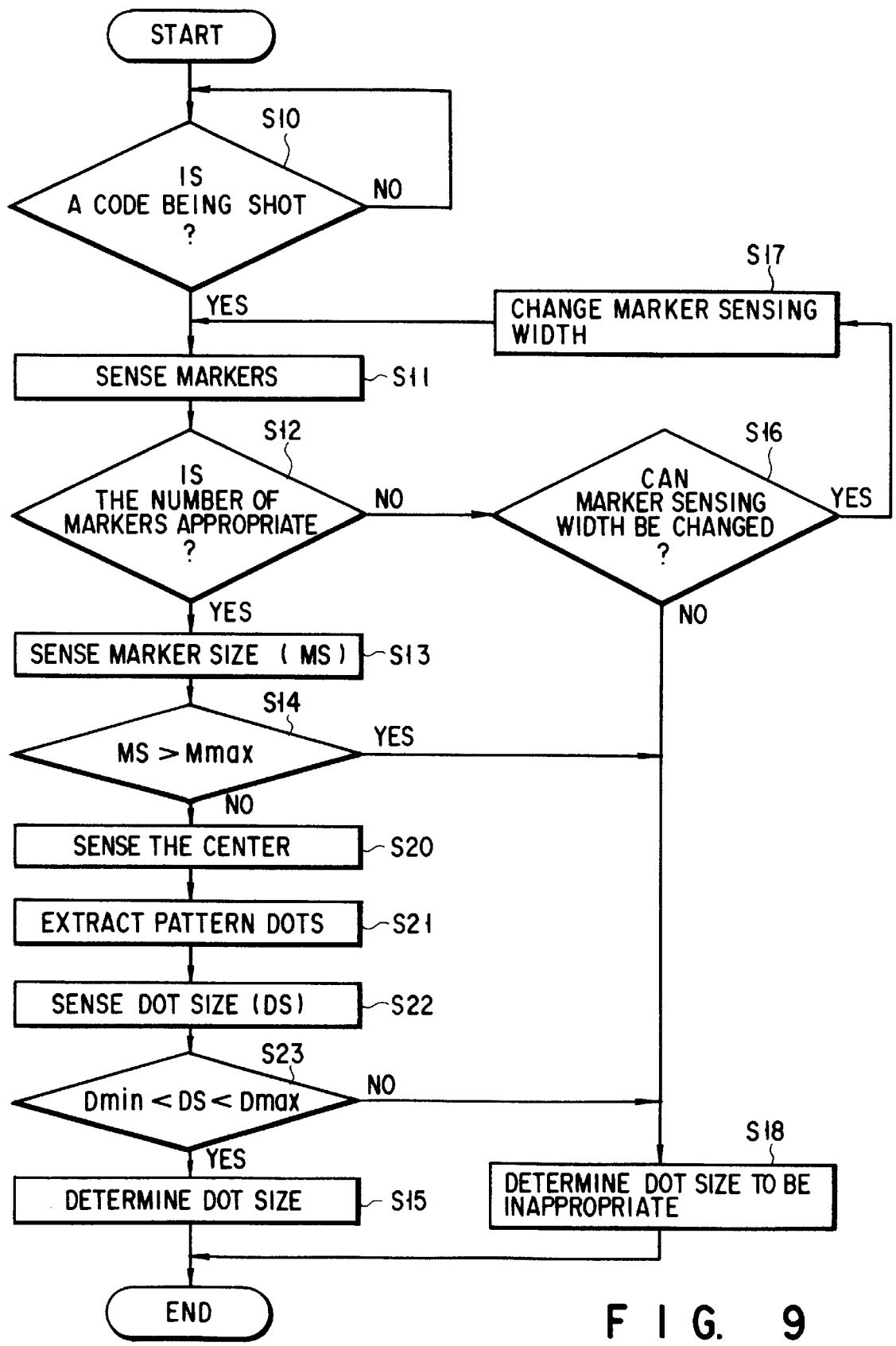
F I G. 9

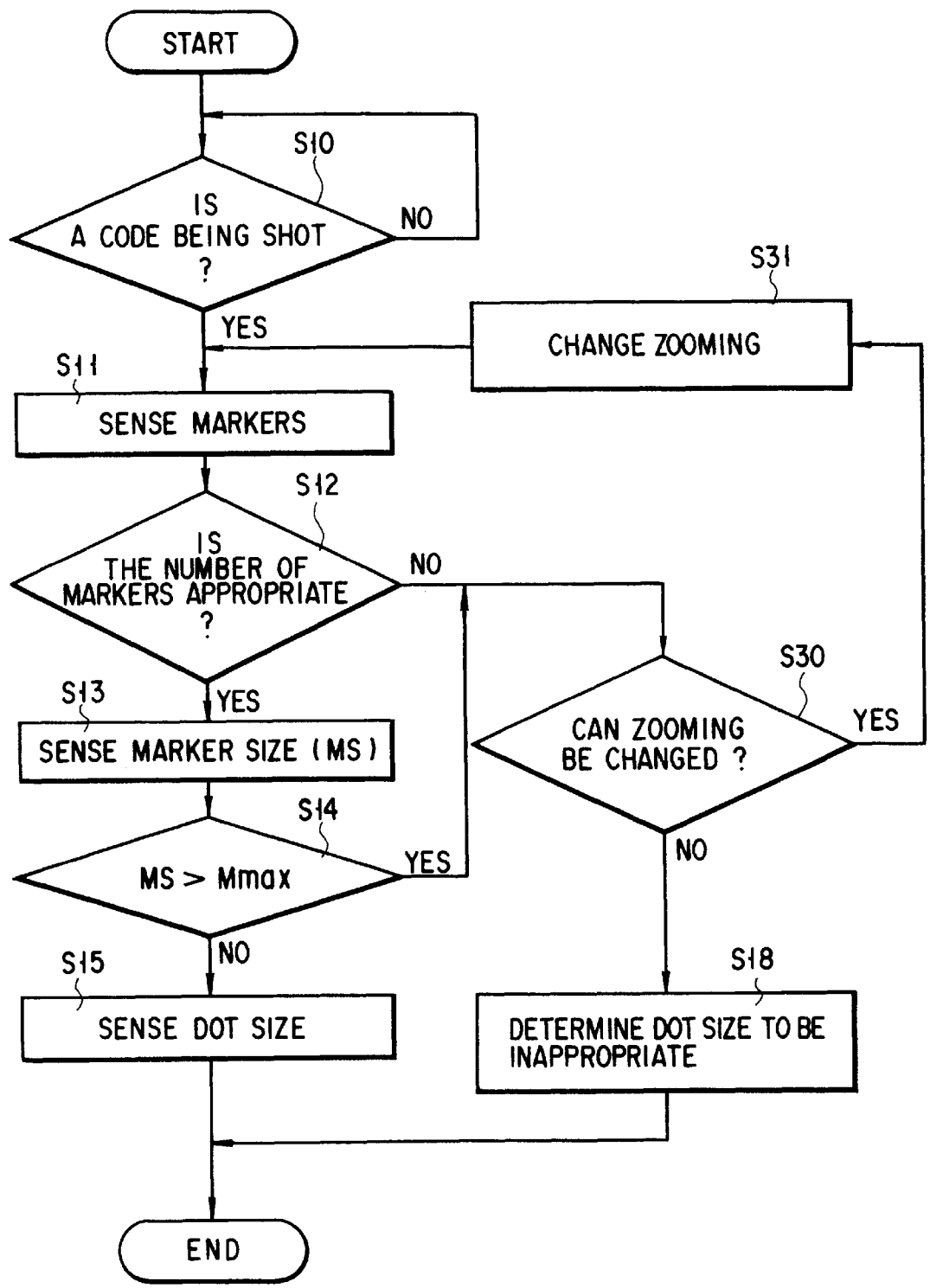
F I G. 14

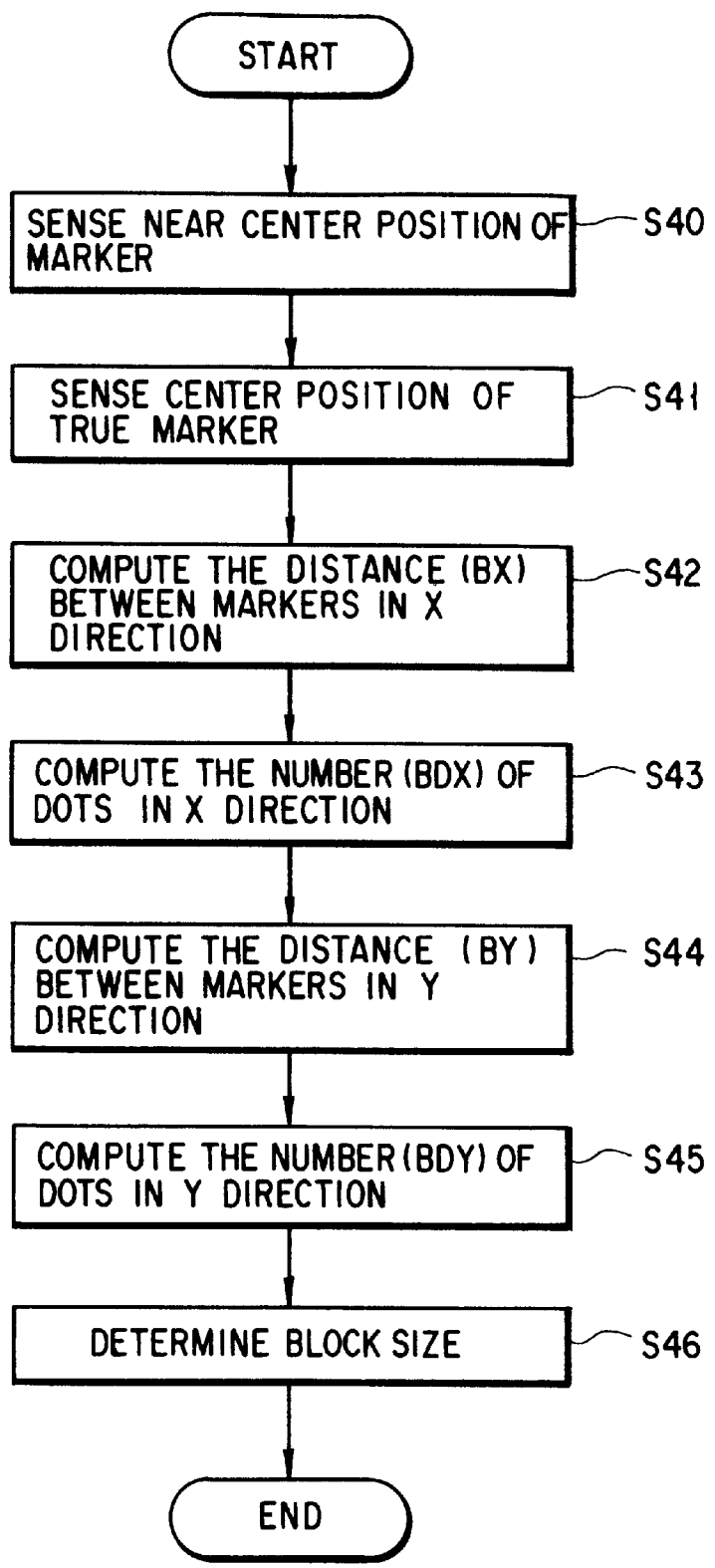
F I G. 15

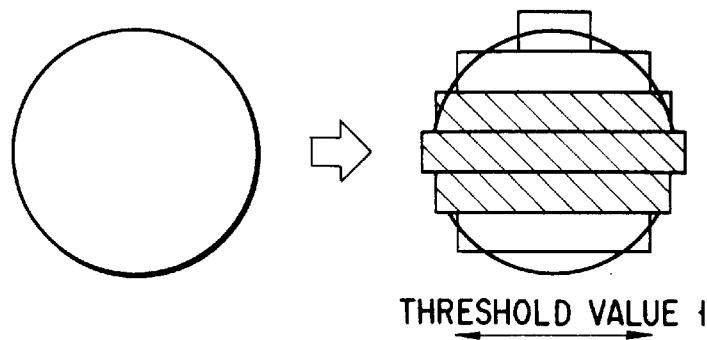
F I G. 17
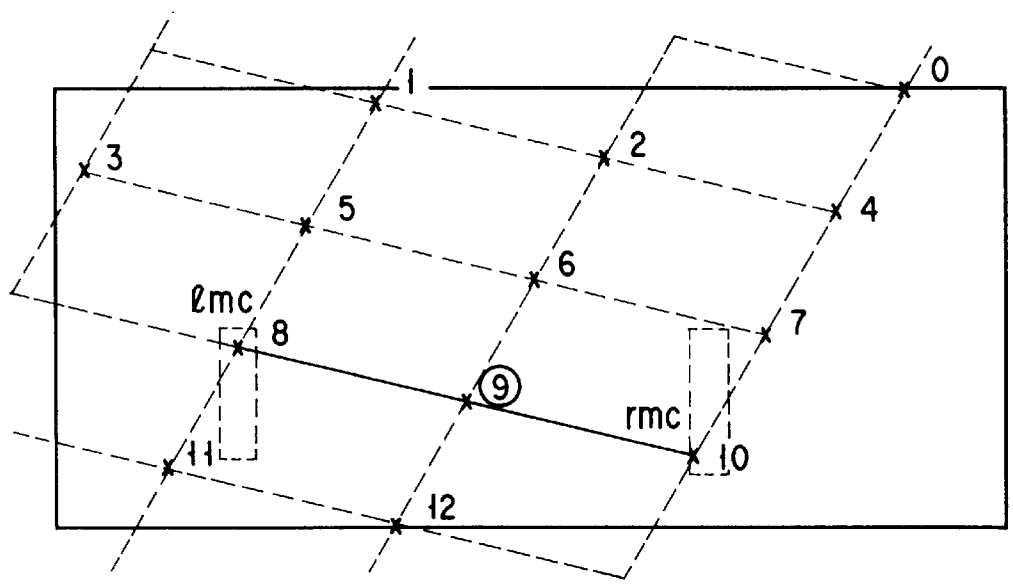
F I G. 18
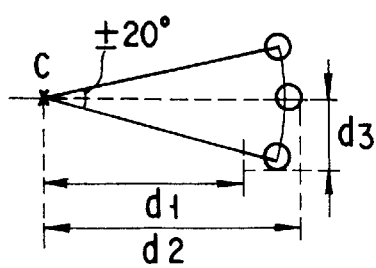
F I G. 19

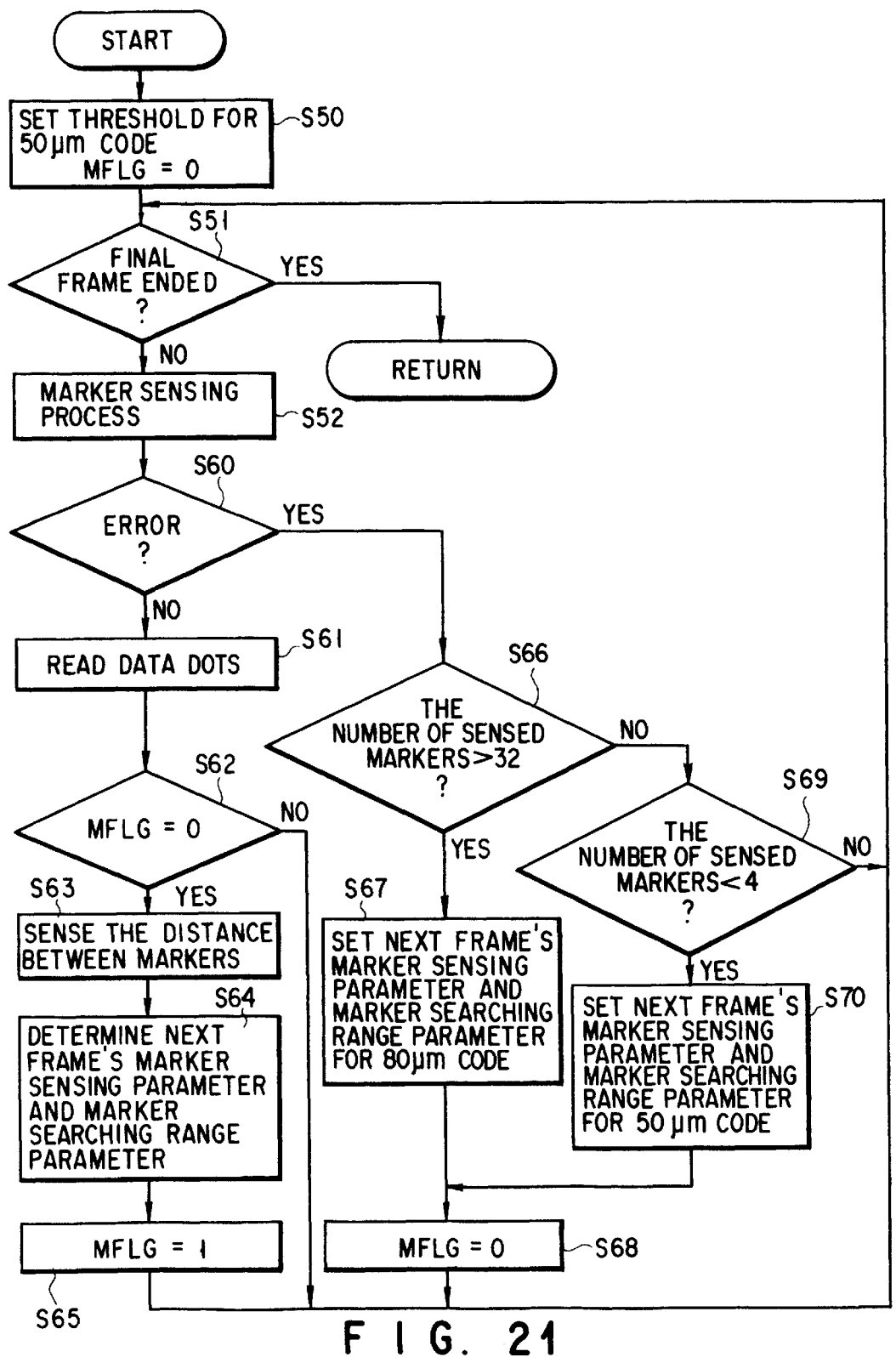
F I G. 21

INFORMATION REPRODUCTION SYSTEM WHICH UTILIZES PHYSICAL INFORMATION ON AN OPTICALLY-READABLE CODE AND WHICH OPTICALLY READS THE CODE TO REPRODUCE MULTIMEDIA INFORMATION

BACKGROUND OF THE INVENTION

1. Field of the Invention

This invention relates to an information reproduction system which optically reads the code patterns from an information recording medium, such as paper, on which multimedia information, including audio information such as speech or music, image information obtained from a camera, a video apparatus, or the like, and text data obtained from a personal computer, a word processor, or the like, is recorded in the form of optically readable code patterns, and which then reproduces the original multimedia information.

2. Description of the Related Art

Magnetic tape, optical disks, and the like have been known as recording mediums for audio information, such as speech or music. Even if copies of those mediums are mass-produced, their unit price is still somewhat high, and to store such copies requires a lot of space. Furthermore, when a medium on which sound has been recorded must be delivered to a person in a distant place, the medium takes a lot of time and labor to mail it or directly convey the medium to the person. The same is true for other multimedia information exclusive of audio information, including image information obtained from a camera, a video apparatus, or the like, and text data obtained from a personal computer, a word processor, or the like.

To deal effectively with such a problem, EP 0,670,555 A1 corresponding to a European Patent Application filed by the assignee of the present application and also to U.S. Ser. No. 08/407,018, has disclosed a system that records multimedia information on an information recording medium, such as paper, in the form of image information that can be transmitted by facsimile and copied in large amounts at low cost, that is, in the form of dot codes consisting of dots, acting as coding information, arranged two-dimensionally, as well as a system for reproducing the original information from the medium.

To reproduce the original information from such dot codes more reliably, PCT/JP95/01467 (filed in the United States as U.S. Ser. No. 08/776,325, filed Jan. 24, 1997), filed by the assignee of the present application, has disclosed a technique for recording on a medium the information, which is called a system control file, representing the processing parameters in the form of dot codes in the same manner as the multimedia information, reading the parameter information first, and setting the individual parameters in corresponding sections of an information reproduction system that optically reads dot codes on an information recording medium-and reproduces the original information. In particular, an example is disclosed whereby the information transfer protocols are divided into layers in a system that records and reproduces dot codes on and from an information recording medium, such as paper. In the example, the parameters needed for the individual layers are read from the system control file beforehand and then set in the corresponding sections.

According to this technique, however, when reading the system control file, the operator must be conscious of reading special dot codes different from normal ones. Specifically, the operator must operate a particular switch to change the mode of the information reproduction apparatus, and then scan and read the system control file to set the parameters.

SUMMARY OF THE INVENTION

The object of the present invention is to provide an information reproduction system capable of automatically setting parameters without requiring any special attention or participation on the part of the operator with respect to reading special dot codes.

The foregoing object is accomplished by providing an information reproduction system comprising: reading means for reading the codes by optical scanning from a recording medium on which multimedia information including at least one of audio information, image information, and text data has been recorded in the form of codes that can be read optically; processing means for processing the codes read by the reading means and restoring the multimedia information; and output means for reproducing each piece of information on the basis of the output signal from the processing means and outputting the reproduced signal, wherein the processing means includes parameter setting means for setting the parameters necessary for the information reproduction system on the basis of physical information on the codes read by the reading means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a flowchart for the process of reading dot codes;

FIG. 4 is a flowchart for the process of sensing the dot size in the first embodiment;

FIGS. 7A and 7B are drawings to help explain the diameter of each marker;

FIGS. 8A and 8B each show the relationship between the marker size and the data dot size;

FIG. 9 is a flowchart for the process for sensing the dot size in a second embodiment of the present invention;

FIGS. 11A to 11C each show a dot-size sensing dot;

FIG. 12 illustrates the shape of a marker that enables the recognition of a dot size;

FIG. 14 is a flowchart for a dot-size sensing subroutine in a fourth embodiment of the present embodiment;

FIG. 15 is a flowchart for a dot-size sensing subroutine in a fifth embodiment of the present embodiment;

FIG. 17 is a drawing to help explain a method of determining a cluster of black pixels larger than a certain size to sense markers;

FIG. 18 shows the positional relationship between markers in a case where a code in an inclined position have been read;

FIG. 19 is a drawing to help explain the marker search range;

FIG. 21 is an operation flowchart to help explain a modification of the example of FIG. 20.

DETAILED DESCRIPTION OF THE PREFERRED EMBODIMENTS

Hereinafter, referring to the accompanying drawings, embodiments of the present invention will be explained.

Figure 1:
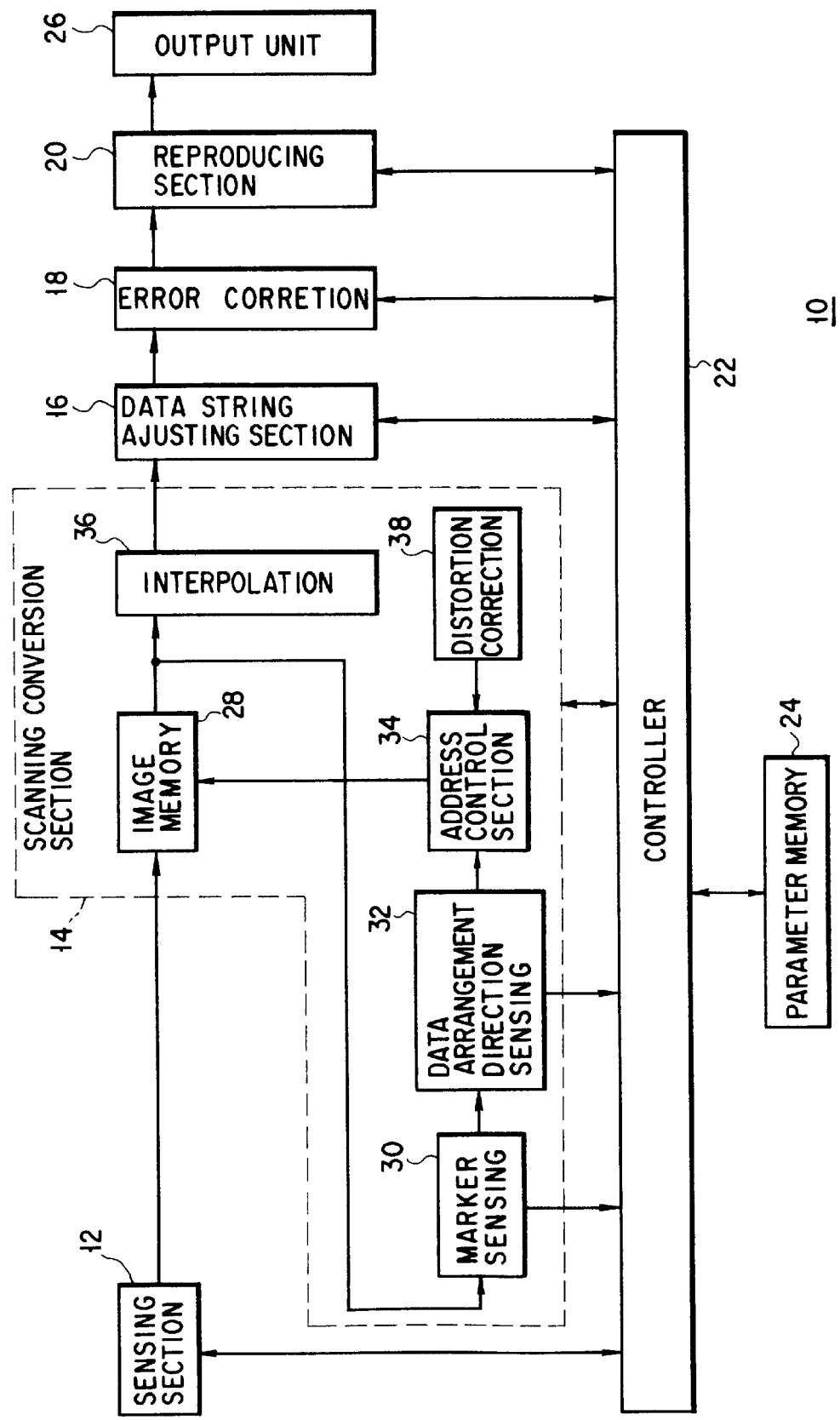
FIG. 1 is a block diagram of an information reproduction system according to embodiments of the present invention.

FIG. 1 shows the configuration of an information reproduction system 10 according to embodiments of the present invention. The information reproduction system 10 comprises: a sensing section 12 that reads dot codes from a sheet (not shown) on which dot codes have been printed; a scanning conversion section 14 that recognizes the image data supplied from the sensing section 12, as dot codes and normalizes the dot codes; an adjusting section 16 that adjusts data strings; an error correction section 18 that corrects reading errors and data errors during reproduction; a reproducing section 20 that separates the data items according to their individual attributes and performs an expansion process corresponding to a data compression process according to each attribute; a controller 22 that controls each of these sections; a parameter memory 24 that stores the parameters for the processing in each section; and an output unit 26, such as a monitor or a speaker.

The scanning conversion section 14 recognizes the image data supplied from the sensing section 12, as dot codes, and normalizes the dot codes. Specifically, the image data from the sensing section 12 is first stored in an image memory 28. Then, the image data is read from the image memory 28 and sent to a marker sensing section 30. The marker sensing section 30 senses a marker for each block. Then, a data arrangement direction sensing section 32 senses the rotation, the inclination, or the direction in which data items are arranged, by the use of the markers. On the basis of the result, an address control section 34 reads the image data from the image memory 28 in a manner that corrects the image data, that is, reads the image data corresponding to the position of each dot of a dot code, and supplies them to an interpolation circuit 36. At this time, the address control section reads the lens aberration information from a correction memory 38 and corrects the distortion of the lens aberration in the image forming optical system of the sensing section 12. The interpolation circuit 36 performs an interpolating process on the image data and thereby converts the image data into the original dot code pattern.

The details of the sensing section 12, scanning conversion section 14, data string adjusting section 16, error correction section 18, reproducing section 20, and output unit 26 have been disclosed in EP 0,670,555 A1 mentioned above, and explanation of them will be omitted.

Figure 2:
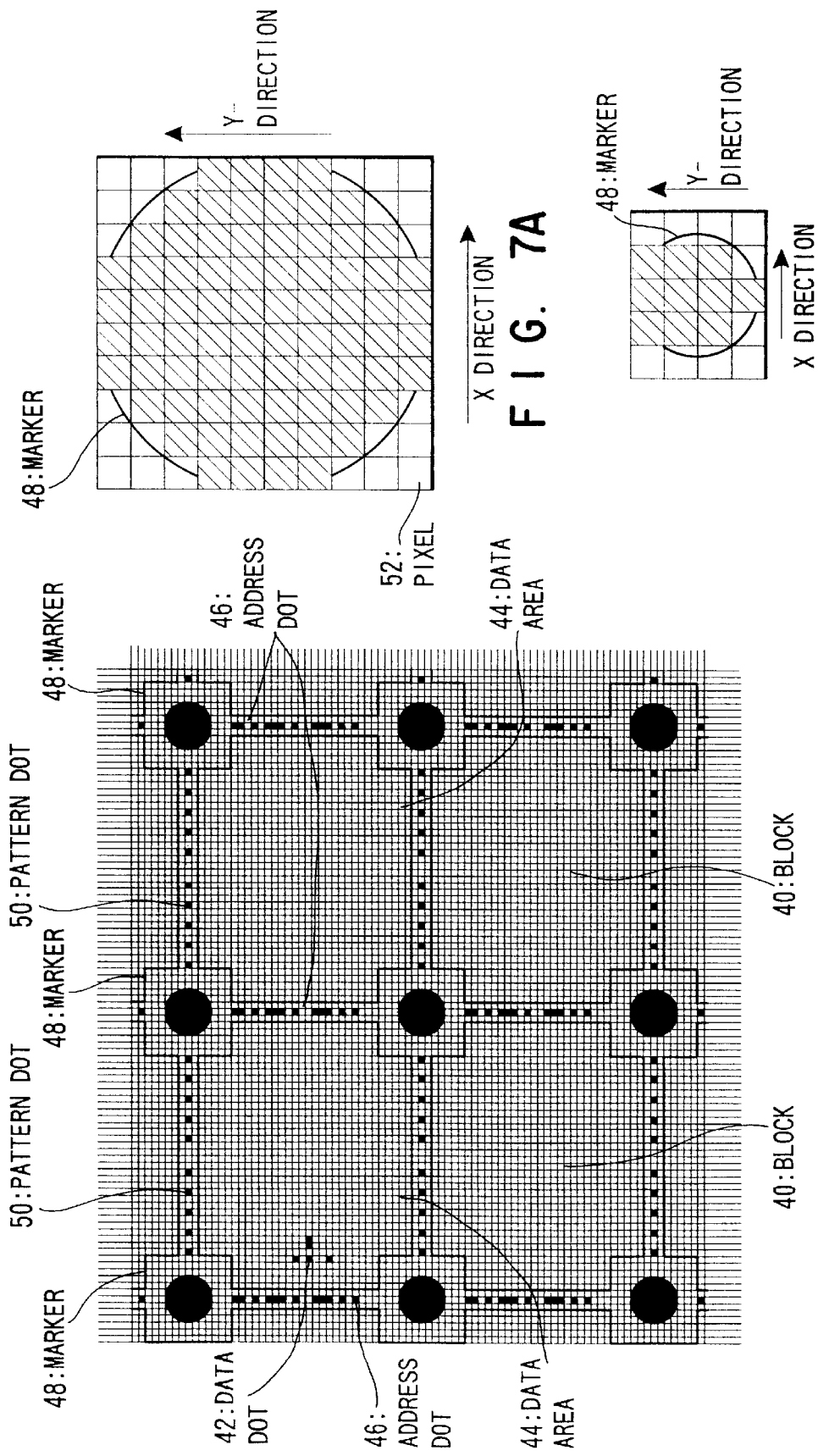
FIG. 2 shows a format of a dot code.

A dot code, for example, is made up of a plurality of blocks 40 arranged in a two-dimensional matrix, each block having a specified number of data dots, as shown in FIG. 2. Each block 40 includes a data area 44 in which a plurality of data dots 42 arranged according to the contents of the information are put, and block address dots 46 that indicate the address of the block and are placed in a specific positional relationship with the data area 44. Each block 40 also includes markers 48 placed in specific positions, such as on its four corners, and specific matching pattern dots 50 placed in specific positions with respect to the markers 48, such as between the markers adjacent to each other in a first direction. The address dots 46 are placed in specific positions with respect to the markers 48, such as between the markers adjacent to each other in a second direction. Each of the pattern dots 50, address dots 46, and data dots 42 put in the data area 44 is of the same size. A marker 48 is designed to be a dot larger in area than each of the above dots. For example, a marker 48 is recorded on a recording medium in the form of a round dot having the diameter seven times as large as that of a data dot.

In the process of reading dot codes, the position of a code extending over more than one frame is determined accurately frame by frame from the shot image and then the data dots 42 are read. The code position information is obtained by accurately computing the coordinates of the markers 48 and the data dots 42 are read using the computed coordinates as reference coordinates.

The method of accurately computing the coordinates of the markers is such that the pattern dots 50 placed between markers are searched for on the basis of the coordinates sensed at the marker sensing section 30, the centroid is obtained for each of the sensed pattern dots 50, the marker coordinates are corrected, or the accurate positional coordinates of the markers 48 are computed from the centroid of each pattern dot 50, and the reading is effected on the basis of the coordinates.

Specifically, as shown in FIG. 3, if the last one of the plurality of frames over which the code extends has not been processed yet (step S1), the marker sensing section 30 will sense markers 48 (step S2). The marker sensing section 30 is composed of means (not shown) for determining the roughly central coordinates of markers 48 from the frame image and means (not shown) for finding sets of adjacent markers from the plurality of markers 48 sensed within a frame.

Next, on the basis of the sensed coordinates, the data arrangement direction sensing section 32 searches for the pattern dots 50 placed between markers (step S3). Namely, in the pattern dot searching process, the pattern dots 50 consisting of a plurality of dots arranged in a specific positional relationship between the markers making a pair are searched for. For example, the pattern dots 50 are put at specific ten of the coordinates obtained by dividing the distance between markers into 43 equal parts. Therefore, some or all of the 10 pattern dots 50 will be sensed unless the positional coordinates of the markers 48 have collapsed badly.

Then, the centroid is calculated for each of the sensed pattern dots 50 (step S4). From the coordinates of the calculated centroid of each pattern dot 50, the coordinates of the markers are corrected, that is, the accurate positional coordinates of the markers 48 are computed (step S5). In the marker coordinate correction, the central coordinates of the markers 48 are corrected by the first-degree recurrence, taking into account the fact that the centroid of each of the plurality of pattern dots 50 is on a straight line connecting markers to each other.

Then, the address control section 34 generates read addresses in the image memory 28 on the basis of the coordinates and reads the values of the data dots from the image memory 28. That is, the data in the image memory 28 is read on the basis of the central coordinates of the markers 48 (step S6) and terminates the processing of the frame.

Thereafter, to process the next frame, the frame to be process is changed to the next frame (step S7) and control is returned to step S1.

In a dot code reading apparatus that performs processing as described above, to effect reading optimally, the read parameters are set in the present invention as described below.

First, a case where the dot size is determined from the size of a marker 48, i.e., piece of physical information on the code, will be described as a first embodiment of the present invention.

What is needed as a parameter at the first stage is the size of an actual data dot 42. Since the size of a marker 48 corresponds to the data dot size on a one-to-one basis (e.g., the dot size of a marker 48 has a diameter equivalent to seven data dots), such a data dot size can be sensed by first finding the size of the marker 48 and estimating the dot size from the found marker size. Such processing procedures enable the size of the marker 48 be sensed at a relatively early stage of the process, with the result being that the parameter can be set early.

Such dot size sensing is actually effected according to a flowchart for the processing of the controller 22 as shown in FIG. 4.

First, it is judged whether or not the sensing section 12 is shooting a dot code (step S10). The processes that follow are prevented from starting until a dot code has been shot.

Once a dot code has been shot, the marker sensing section 30 senses markers (step S11). The marker sensing is such that when as many blacks as a certain number or more are present consecutively in a one-dimensional direction, the series of blacks is judged to be a marker 48.

On the basis of the sense result from the marker sensing section 30, the controller 22 judges whether or not the number of markers 48 is appropriate (step S12). For example, it is assumed that the information reproduction system 10 can handle three size levels: the dot sizes of the order of 100 $\mu$m, those of the order of 1 mm, and those of the order of 1 cm. On this assumption, with the setting to read dot sizes of the order of 100 $\mu$m, when an attempt is made to read dot codes of the order of 1 cm, the data dots 42 will be sensed as markers 48, permitting the number of markers 48 to exceed a predetermined range. This is unacceptable. Conversely, with the setting to read dot sizes of the order of 1 cm, when an attempt is made to read dot codes of the order of 100 $\mu$m, even the markers 48 will be too small to be sensed as markers, preventing the number of markers to reach the predetermined range. This is unacceptable.

Figure 5:
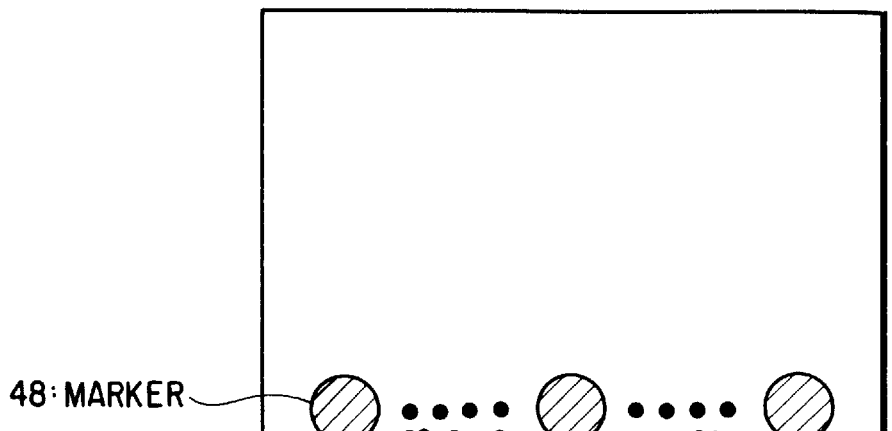
FIG. 5 illustrates an example of a shot image to help explain judgment on whether the number of markers is appropriate.

There may be a case where at the beginning of scanning, only three markers 48 come out at the bottom of the image area in which nine markers 48 are supposed to appear, with scanning being effected toward the bottom, as shown in FIG. 5. Thus, even if the settings of the information reproduction system 10 are correct, the number of markers may be judged to be inappropriate. To avoid the problem, as long as there are an appropriate number of markers in a certain direction, the number of markers is judged to be appropriate at step S12.

While in FIG. 5, three markers 48 come out in one direction, there may be a case where only two markers appear on the image area when the scanning has shifted to either side. To cope with this problem, the process at step S12 may include the judgment as to which side the scanning has shifted to in the light of the relative positions of the individual markers 48 on the screen.

Figure 6:
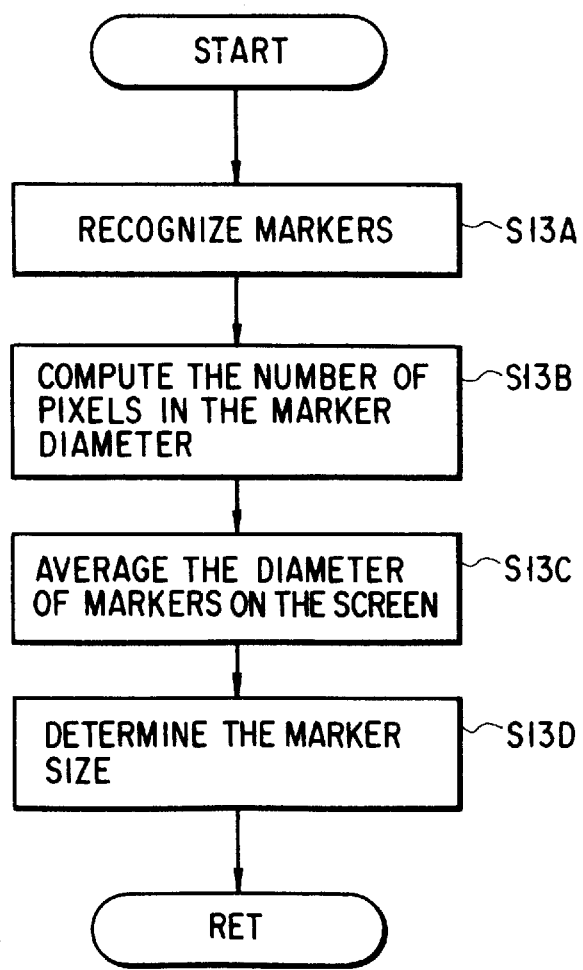
FIG. 6 is a flowchart for a marker size sensing subroutine.

If the number of markers 48 thus sensed in one direction has been judged to be appropriate, the marker size (MS) will be sensed (step S13). The marker size sensing is performed as shown in FIG. 6.

First, the markers 48 are recognized (step S13A). This is the process of eliminating what have been sensed erroneously as markers, or faulty markers. For instance, because the positional relationship between adjacent markers has been determined, what does not agree with the positional relationship can be judged to be a faulty marker.

After the recognition of markers, the number of pixels in the diameter of each marker 48 sensed on the screen is counted (step S13B), and the average of the diameters of the markers 48 on the screen is computed (step S13C). The number of pixels in the average diameter is determined to be the marker size (step S13D).

In a case where a marker 48 is shot by the imaging element (not shown) in the sensing section 12 as shown in FIG. 7A, when the sensing is done in the X direction, the diameter of the marker contains 10 pixels because 10 black pixels are present consecutively, with each box in the figure representing a pixel 52. The same is true when the sensing is done in the Y direction. In a case where a marker is shot as shown in FIG. 7B, the diameter of the marker contains three pixels in the X direction and four pixels in the Y direction.

This holds when the marker is processed in binary. If the marker is processed in multivalue, the boundary can be predicted to some extent.

After the marker size has been determined in this way, it is judged whether or not the marker size has exceeded the specified maximum value (Mmax) (step S14). If the marker size has not exceeded the maximum value, it will be determined to be a normal marker 48. Then, the dot size is estimated uniquely and determined from the relationship in size between the marker 48 predetermined from the format and the data dot 42. The determined dot size is stored in the parameter memory 24 (step S15).

The reason why only the maximum value is used for comparison at step S14 is that a comparison with the minimum value has been made in marker sensing at step S11. A judgment using the minimum value may, of course, be made again here.

With the magnification of the lens in the imaging optical system (not shown) of the sensing section 12 being L, and the pixel size of the imaging element (not shown) being (Px, Py), if the number of pixels in the average diameter of the marker 48 is Nm, the marker size MS will be expressed as:

$$MS = (Px/L)Nm$$

Because L and (Px, Py) are the values peculiar to the reproduction system, the number of pixels Nm counted in the marker 48 is used to represent the marker size.

At step S12, if the number of pixels in the marker 48 has judged to be inappropriate, it will be judged whether or not the marker sensing width can be changed, that is, whether or not suitability to all of the three levels have been checked (step S16). If the width can be changed, the marker sensing width will be changed (step S17), and control will be returned to step S11, where marker sensing will be effected again.

If the width cannot be changed, the dot size will be determined to be inappropriate (step S18), and the process will be terminated. Similarly, if at step S14, the sensed marker size has been judged to be larger than the specified maximum value, the dot size will be determined to be inappropriate and the process will be terminated.

As a second embodiment of the present invention, a method of finding the size of a data dot 42 from physical information on the matching pattern dots 50, will be described.

As shown in FIGS. 8A and 8B, there may be a case where the size of a marker 48 is the same but the size of a data dot 42 is different. The size of a data dot 42 is determined by the use of a pattern dot 50 that can be sensed easily because its position with respect to the marker 48 is predetermined and that is recorded in the same size as that of a data dot 42.

In this case, sensing the dot size is effected according to the flowchart of FIG. 9. The same processes as those in the first embodiment are indicated by the same reference numerals and explanation of them will be omitted.

Figure 10:
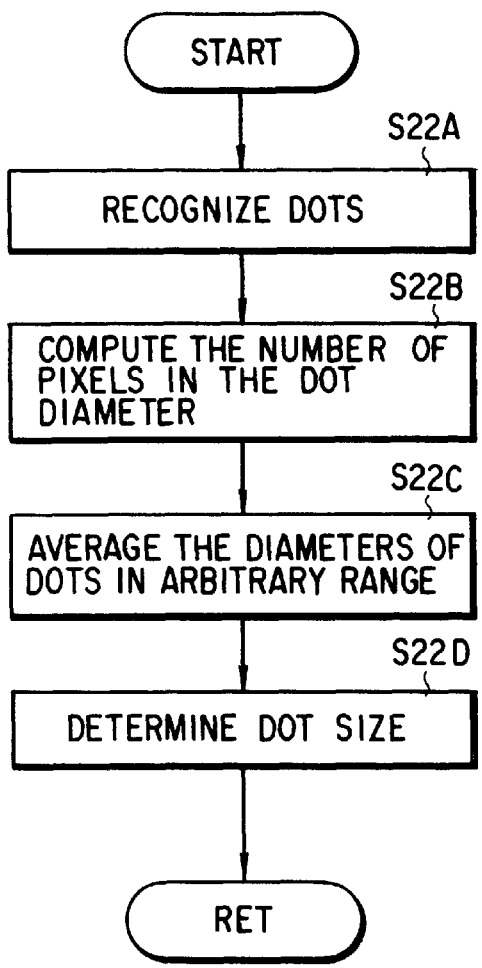
FIG. 10 is a flowchart for a dot size sensing subroutine in the second embodiment.

The marker size is sensed as described earlier. If the sensed marker size is not larger than the specified maximum value, the center of each marker 48 will be sensed (step S20) and the pattern dots 50 on the scanning line connecting the sensed centers to each other will be extracted (step S21). Then, the size DS of the extracted pattern dot 50 is sensed as shown in FIG. 10 (step S22).

Specifically, as with the marker, after a dot has been recognized (step S22A), the number of pixels in the dot is calculated (step S22B). Then, to reduce the volume of processing, the diameters of the dots in an arbitrary range are averaged (step S22C). The same may be done in the range of the entire screen. The computed average value is determined to be the dot size (step S22D).

After the dot size has been sensed, it is judged again whether or not it is in the specified range (Dmin to Dmax) (step S23). If the dot size is in the range, it will be finally determined to be the size of the data dot 42 and the size will be stored in the parameter memory 24 (step S15). Then, the process will be terminated.

While in the above explanation, the size of the pattern dot 50 is the same as that of the data dot 42, they may actually differ in size.

In that case, a sensing dot 54 of the same size as that of the data dot 42 may be recorded in a predetermined position with respect to the marker 48, for example, between the marker 48 and the pattern dot 50 as shown in FIG. 11A, or be recorded as a white dot as shown in FIGS. 11B and 11C, and the dot size may be recognized by sensing the dot.

Furthermore, instead of forming a marker 48 into a black circle, a maker 48 may be formed into a shape where black lines each n, n+2, and n+4 times as long as the size DS of a dot are laid one on top of another and the dot size may be recognized by sensing each length, as shown in FIG. 12. In this case, making the width of each line greater increases the allowance for rotation.

As a third embodiment of the present invention, a method of determining the dot size using the distance between the centroids of the matching pattern dots 50, physical information on codes, will be described.

The size of a pattern dot 50 may be changed, depending on the physical properties of ink or its amount during printing. To overcome the problem, in the third embodiment, the distance between the centroids of the pattern dots 50 is found and the dot size is computed from the distance, thereby absorbing changes in the dot size.

Figure 13:
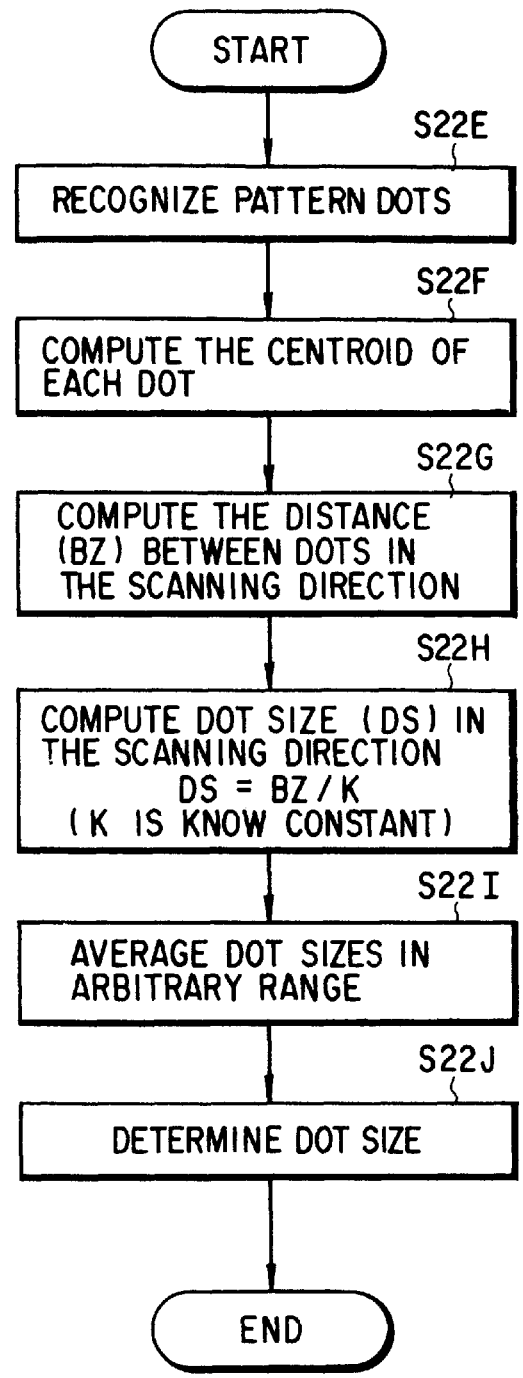
FIG. 13 is a flowchart for a dot-size sensing subroutine in a third embodiment of the present embodiment.

Because the flowchart of the third embodiment is the same as that of FIG. 9, only the process of sensing dot sizes at step S22 will be explained using FIG. 13.

First, after the pattern dots 50 have been extracted, the pattern dots are recognized (step S22E) and the positions of the centroids of the dots are determined (step S22F). After the distance (BZ) between the centroids has been found (step S22G), a dot size (DS) is calculated (step S22H). Since the distance between pattern dots has been specified, if the distance between pattern dots is K times as large as the dot size, DS will be expressed as BZ/K. The DSs thus computed are averaged in an arbitrary range (step S22I) and the dot size is determined (step S22J). Thereafter, control proceeds to step S23 in FIG. 9.

With the third embodiment, even when the dot size has changed due to printing, an appropriate dot size can be computed because the distance of the centroids of dots is used.

A fourth embodiment of the present invention will be explained. In this embodiment, a zooming mechanism is provided in the optical system (not shown) of the sensing section 12.

With this embodiment, the dot size is sensed according to the flowchart of FIG. 14. The same processes as those in the first embodiment are indicated by the same reference numerals and explanation of them will be omitted.

When the number of markers has been judged to be inappropriate at step S12, for example, when the number of markers 48 is small because the magnification of the lens is too high, it will be judged whether or not the zooming can be changed (step S30). If it can be changed, the zooming will be changed (step S31) and control will return to step S11, where markers will be sensed again. Since an appropriate number of markers 48 should be present in a single screen, the magnification continues being changed until a range in which a single screen contains an appropriate number of markers has been reached.

As a fifth embodiment of the present invention, a method of setting, as a parameter, the size of a block 40, physical information on a code, will be explained by reference to FIG. 15.

First, an approximately central position of a marker 48 is sensed (step 40) and the true marker central position is sensed (step S41). The method of sensing an approximate center and the true center has been described in detail in EP 0,670,555 A1 or U.S. Ser. No. 08/571,776 filed by the assignee of the present application, and explanation of the method will be omitted here.

Then, the distance (BX) between markers 48 in the X direction is computed (step S42). In this case, the X direction may be either the direction along the matching pattern dots 50 or the direction along the block address dots 46. Here, the direction is assumed to be the direction along the pattern dots 50. Simply dividing the distance between markers by the dot size DS gives the number of dots in the X direction (BDX), or the block size in the X direction (step S43).

Next, the distance between markers (BY) in the Y direction, for example, in the direction along the block address dots 46, is computed (step S44). Dividing the distance by the dot size gives the number of dots (BDY) in the Y direction, or the block size (step S45).

From the number of dots in each of the X direction and the Y direction thus computed, the block size is determined and the determined block size is stored in the parameter memory 24 (step S46). That is, the block size is stored in the form of m dots x n dots (m and n are integers).

Figure 16:
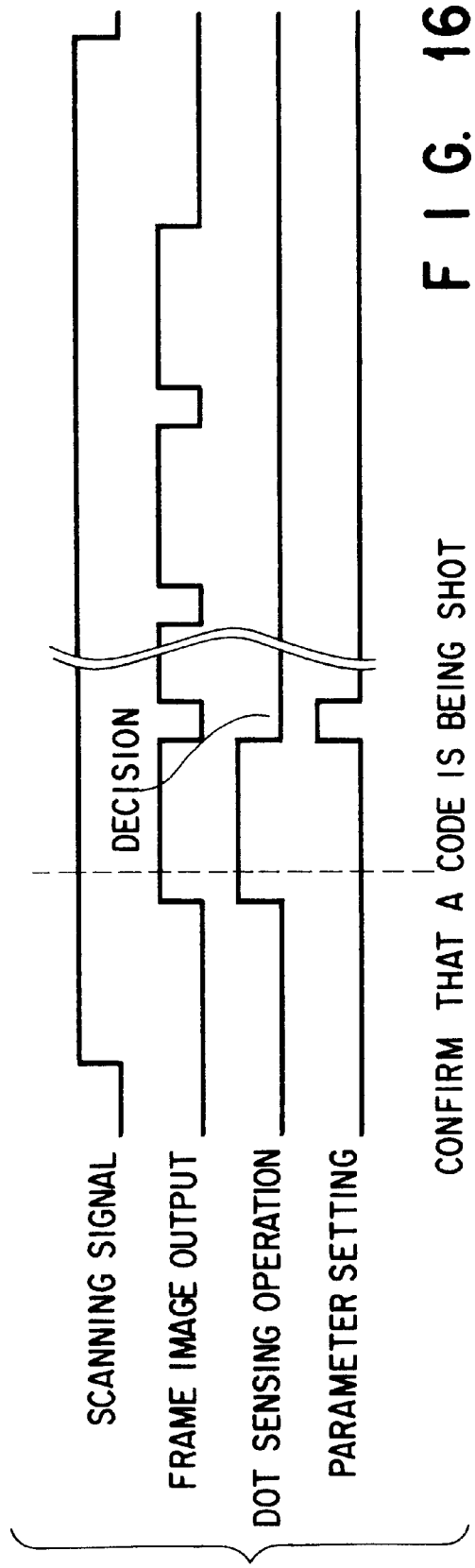
FIG. 16 is a timing chart to help explain the timing for parameter sensing.

FIG. 16 is a timing chart showing the timing with which parameters including the dot size and block size are sensed.

When an image is actually inputted in response to a scanning signal, a dot sensing operation is started. First, a check is made to see if a dot code has been shot. If it has been shot, the above-described operations, beginning by sensing the diameter of an actual marker 48, will be performed and the parameters will be determined. Then, the determined parameters are set and each section is operated according to the settings during the scanning of the dot from this time on.

By determining the parameters at an early stage, it is possible to prevent the processing from becoming more complex. In actual code scanning, the imaging section is set at the head of the code and the scanning is started from that point. Therefore, a dot code is stationary or almost stationary when having been shot at an early stage of the scanning and the movement of the dot is small. As a result, the distortion of the dot is small, making it possible to judge the dot size accurately.

Now, the necessity of reading codes of different sizes will be explained below.

In reading codes, dot codes are read over a plurality of frames. At the time of starting to read, however, the sizes of dot codes are unknown.

The dot-code creator side may create codes without taking into account a dot reading unit, with the result that they will sometimes produce codes of various sizes, depending on the performance of a code output unit, such as a printer, or the resolution of a printer.

In this case, since the reading unit must read codes of different dot sizes (because the interval is almost equal to the dot size, the dot pitch similarly differs code by code), it must have the scalability enabling the reading of codes on different scales.

Namely, the scalability is the ability to read codes enlarged or reduced at a certain magnification, with their similarity with the normal codes to be read remaining unchanged. A scalability of twice means the ability to read the codes obtained by enlarging normal codes at magnifications ranging from 1 to 2.

A method of setting marker sensing parameters will be explained below.

The method of sensing markers is a method of finding clusters of black pixels larger than a certain size. The process will be described by reference to FIG. 17.

In the case of a marker 48 that is round and larger than a data dot 42, its run length is compared with a threshold value. If the run length is larger than the threshold value, it will be determined to be a marker candidate. In FIG. 17, the hatched portion has a run length larger than the threshold value. The portion is extracted as a marker candidate.

Specifically, the marker sensing section 30 counts a black run in each line. When the count is equal to or larger than a first threshold value (hereinafter, referred to as threshold value 1), the coordinates of the head of the run and its run length will be recorded in the internal memory (not shown).

In the memory, the right and left ends of a cluster of a black run and the vertical width of the cluster can be recorded. From these pieces of information, runs in contact with each other can be sensed. Eventually, it is found how many pixels are in the horizontal width of the cluster as a marker candidate and how many lines are in its size. The horizontal width is compared with a second threshold value (hereinafter, referred to as threshold value 2) and the number of lines is compared with a third threshold value (hereinafter, referred to as threshold value 3). What is larger than a marker is determined to be dust or noise and left out from marker candidates Threshold value 1 to threshold value 3 must be selected suitably according to the size of the marker 48, or the size of the code.

When a code is formed by printing, part of the marker 48 may be missing due to a defect in printing, resulting in only about 70% of the run length of the original size. Therefore, threshold value 1 is normally set at 50% of the diameter of the marker 48.

Normally, since the marker 48 has a diameter three times or more or 10 times or less as large as that of the data dot 42, threshold value 1 is about 1.5 times as large as the diameter of the data dot 42, when the marker size is the smallest relative to the data dot 42 (the marker diameter is three times that of the data dot 42).

Therefore, when the scalability is 1.5 times or more, the data dot 42 may be larger than threshold value 1.

In dot code reading, when another judgment criterion is also used in addition to threshold value 1 to reduce the probability that the data dot 42 will be mistaken for the marker 48, all of the data dots 42 can't be mistaken for markers 48. In a process where only markers 48 should be extracted, however, there is a possibility that not only markers 48 but also data dots 42 will be extracted.

Because the data dots 42 thus sensed act as faulty markers and make the subsequent processes complicated, it is desirable that the faulty markers should be reduced as much as possible.

A higher scalability permits many faulty markers to be sensed, when a code with a greater magnification has been read. This makes the load on the reading process larger. The block cannot be read in the frame during a single frame processing period, depending on the situation.

For example, when the number of marker candidates that can be processed in a frame is 32 at maximum because of the memory capacity, more makers cannot be read at all in a system designed to interrupt the frame process at the instant when more than 32 markers 48 have been sensed.

From a different point of view, it is found that the value of threshold 1 is too small, when more than 32 markers 48 have been sensed. In that case, threshold value 1 is made larger.

In the above example, threshold value 1 is set at a value 1.5 times the size of a normal code. With a scalability of 1.5 times, a data dot 42 almost as large as threshold value 1 will be inputted. At this time, the possibility that a data dot 42 will be mistaken for a marker 48 will become much stronger, and the number of sensed marker candidates exceeds 32, thus permitting errors to occur in the marker sensing process.

In that case, because multiplying threshold value 1 by 1.5 prevents a data dot 42 from being mistaken for a marker 48, a marker 48 can be sensed correctly in the process of the next and later frames.

Similarly, when no marker 48 has been sensed at all, it is judged that the value of threshold value 1 is too large and the value of threshold value 1 is made smaller, which will correct the situation.

Now, a method of setting the marker search area parameter will be explained below.

Because in the processing of the first frame, the size of a code is unknown, such parameters as enable codes of various sizes to be read are set. Once a code has been read, however, the size of the code is known and remains unchanged as long as the same code is being scanned. Namely, in the frames after the size has been known, reading can be done using the optimum parameter for the size.

A case where sets of adjacent markers are found from the markers 48 sensed in a frame in the marker sensing process at the marker sensing section 30 will be described using FIG. 18.

FIG. 18 shows an example of a code diagonally inclined being read. A solid-line quadrangle is the field of vision of a CCD serving as the sensing section 12. The broken lines represent the block boundaries of the code. At the intersections of the broken lines, marker candidates are present. A marker candidate is a cluster of dots approximately as large as the size of the marker 48 sensed in the marker sensing process. Actually, a marker candidate may include not only a marker 48, but also data items other than a marker, which have been caused by noise or dirt. In the example of FIG. 18, 13 marker candidates have been sensed on the screen (they are indicated by numerals 0to 12).

Now, for example, let's consider marker candidate 9 in the figure. The marker candidates on both its right and its left are marker candidate 8 and marker candidate 10, respectively. A pattern dot 50 is placed between the considered marker candidate and each of the marker candidates on both sides of the considered marker candidate.

If marker candidates 8, 9, and 10 are true markers 48, they will line up on a straight line at regular intervals. Therefore, it is found that marker candidates that are not on a straight line at regular intervals do not belong to sets of true markers.

To check to see if marker candidates are on a straight line, it is necessary to sense the marker candidates existing within a specific distance from the considered marker candidate.

Let's consider a case where a code whose inter-marker distance is equivalent to 35 data dots 42. If data dots 42 of the normal dot size are shot with the size equivalent to three pixels, the inter-marker distance will appear as an interval equivalent to 105 pixels on the screen.

At this time, the imaging system may be rotated on the optical axis with respect to the code. If the rotational angle is restricted to 20 degrees or less, the considered marker and adjacent markers pairing with the considered marker will be present in the range of 105×cos 20° to 105 pixels in the horizontal direction with respect to the considered marker and in the range of 0 to 105×sin 20° pixels in the vertical direction with respect to the considered marker. As described above, the area in which pair markers exist can be determined to be d1=105×cos 20°, d2=105, and d3=105×sin 20° according to the size of dot from the considered marker candidate C as shown in FIG. 19.

Because the size of a code is unknown at the time of starting to read a code, it is necessary to set d1, d2, and d3 at such values as can cope with all codes that will possibly be read in a situation where the diameter of a data dot is unknown.

For instance, when a code is twice as large as a normal code, that is, when the dot size copes with up to a code equivalent to six pixels in the above example, the code will be equivalent to an area with d1=105×cos 20°, d2=210, and d3=210×sin 20° pixels.

Once the code has started to be read, the code size is known. A marker candidate is searched for in the range suited for the size.

For instance, after it has been verified that the code is twice as large as the normal size, a marker candidate is searched for in the range with d1=105×cos 20°, d2=210, and d3=210×sin 20° pixels.

Narrowing the search range not only shortens the searching time, but also reduces faulty markers, or data items other than the markers sensed in the range, caused by dust or noise, thereby alleviating a burden on the subsequent processes.

To know the size of a code, for example, the method of setting parameters by the use of the inter-marker distance can be applied to the process of checking markers at step S13A, which is the first step in the marker size sensing process at step S13 in the first embodiment. If no adjacent marker candidate is present in the inter-marker distance, that is, when adjacent marker candidates do not present in the predetermined range on the straight line or do not line up at regular intervals, control will proceed to step S16. This enables all parameters at three levels, that is, parameters corresponding to codes of a 100-μm, a 1-mm, and a 1-cm size, to be tried.

An example of setting the parameters because an error has occurred in sensing markers will be explained below.

For example, if a black run longer than threshold value 1 explained in FIG. 17 has been sensed in the marker sensing process, the marker sensing process will return the error. When an error has occurred, the existence of such a long run in the code means that threshold value 1 has not reached an appropriate value as compared with the size of the dot. Thus, threshold value 1 is increased.

The marker sensing process is a process first carried out in the code reading process. In the marker sensing process, by resetting the parameters when an error has occurred in the run length, the parameters can be set optimally at a very early stage of the reading process, reducing the number of data dots to be missed in reading.

Figure 20:
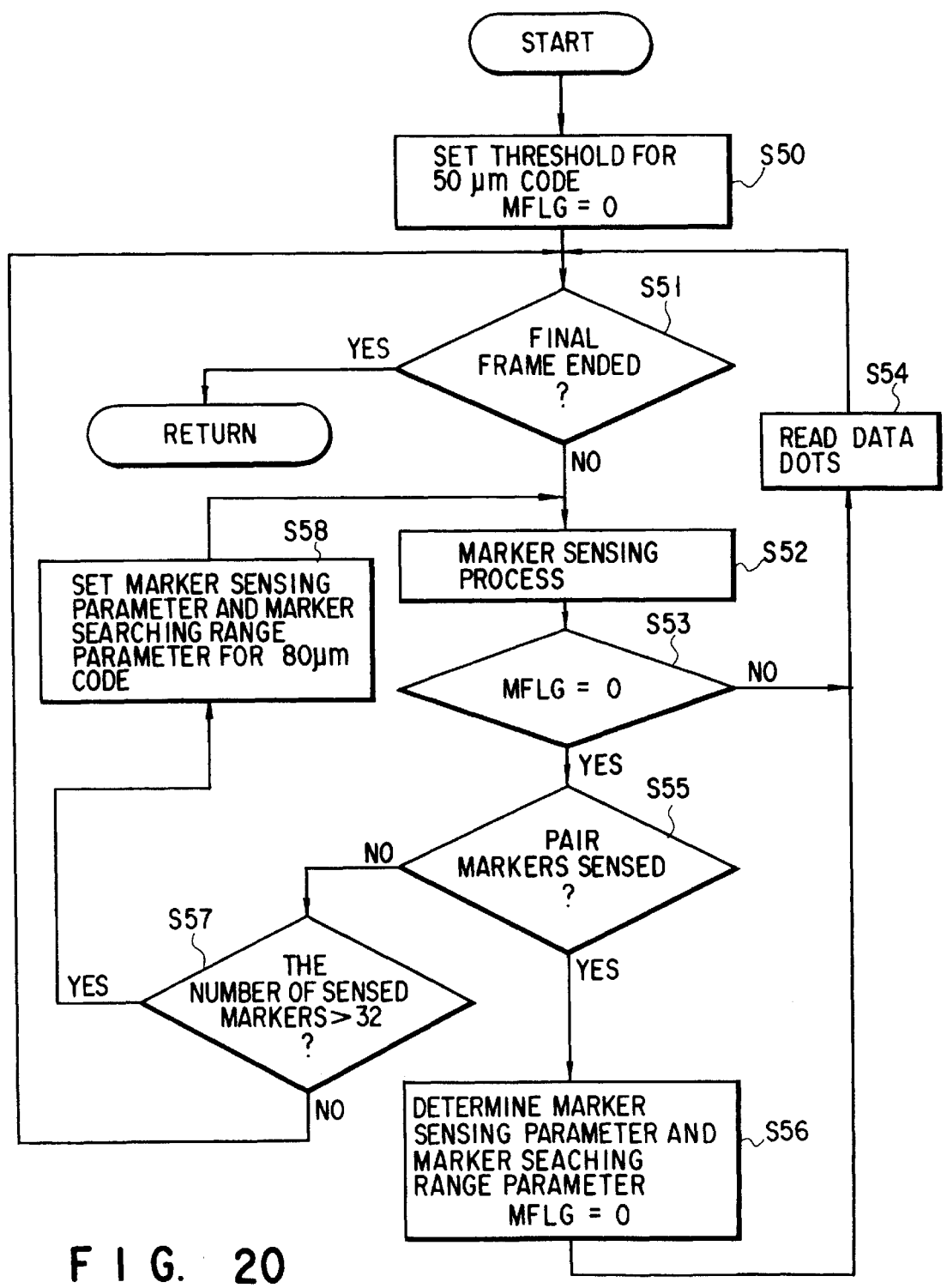
FIG. 20 is a flowchart to help explain an example of the process with a scalability of 1.6 times in a system that normally reads codes with a pitch of 50 $\mu$m.

Referring to FIG. 20, an example with a scalability of 1.6 times in a system that reads codes with a pitch of 50 μm will be explained.

Before a frame process, reading is effected using the parameters for a dot pitch of 50 μm and a flag MFLG for parameter decision recognition is reset to "0" (step S50).

With the setting, codes with dot pitches ranging from 50 to 60 μm can be read satisfactorily and even codes with a dot pitch of 70 μm can be read acceptably. Codes with a dot pitch of 80 μm, however, will sometimes not be read.

Then, if the last frame is not the final one (step S51), the marker sensing process will be performed (step S52). If the parameter decision flag MFLG is not at "0" (step S53), it will be judged that the parameters have been decided and a data dot 42 will be read (step S54).

The reading of a data dot 42 at step S54 includes the sensing of markers, the searching for of pattern dots, the computation of the centroid of a pattern dot, the correction of marker coordinates, and the reading of data dots.

If at step S53, it is-judged that the parameter decision flag MFLG has been reset, it will be judged whether or not pair markers have been sensed (step S55). If they have been sensed, the size of the code will be estimated from the distance between the markers making a pair, the optimum parameters be set, "1" be set in the parameter decision flag MFLG (step S56), and thereafter control will proceed to step S54, where the data dot reading process will be performed.

If at step S55, no pair marker has been sensed, it will be judged whether or not the number of markers sensed in the marker sensing process at step S52 is larger than 32 (step S57). If the number is larger than 32, the parameters for a dot pitch of 80 μm will be set (step S58) and control will return to step S52, where the marker sensing process will be carried out again.

With the setting, codes with dot pitches ranging from 70 to 80 μm can be read satisfactorily and even codes with a dot pitch of 60 μm can be read acceptably. Codes with a dot pitch less than 60 μm, however, will sometimes not be read.

If at step S57, no pair marker has been sensed and it has been judged that the number of markers sensed is 32 or less, it will be judged that such a correct code as has markers making a pair on the screen has not been shot and control will return to step S51 to effect the processing of the next frame without changing the parameters.

The series of processes enables the marker sensing to be carried out reliably and can cope with a scalability of 1.6 times. Furthermore, use of the parameter decision flag MFLG eliminates the process of deciding the parameters after the parameters have decided once.

A modification of the above example will be described by reference to FIG. 21.

Before the processing of a frame, reading is done using the parameters for a dot pitch of 50 μm and the flag MFLG for parameter decision recognition is reset to "0" (step S50). Then, if the last frame is not the final one (step S51), the marker sensing process will be performed (step S52).

The processes up to this point, that is, parameter setting before the frame processing and use of the flag, are the same as in the example of FIG. 20. In this example, however, it is then judged whether or not an error has been sensed in the marker sensing process (step S60). Only when no error has been sensed, the data dots 42 in that frame will be read (step S61). At the time when the reading has been completed, it is judged whether or not the parameter decision flag MFLG has been reset (step S62). If the parameter decision flag MFLG has been reset, or is at "0", the inter-marker distance will be sensed (step S63) and on the basis of the value, the parameter used for the next and later frames will be set (step S63). At the same time, "1" will be set in the parameter decision flag MFLG (step S65) and control will return to step S51.

In the inter-marker distance sensing at step S63, the marker coordinates corrected in the marker coordinate correction process at step S5 in the data dot reading process of FIG. 3 are used. In the process, when the data dot reading has been completed properly, the parameter decision flag MFLG is set, thereby deciding the parameters. This increases the reliability of the parameters.

If at step S60, it has been judged that an error has been sensed during the marker sensing, it will be judged whether or not the number of markers sensed is larger than 32 (step S66). If the number of markers sensed is larger than 32, the parameters will be changed to those for larger codes (in this example, codes with a code pitch of 80 μm) (step S67). Then, the parameter decision reset flag MFLG will be reset (step S68) and control will return to step S51.

If at step S66, it has been judged that the number of markers sensed is 32 or less, it will be judged whether or not the number of markers sensed is too small (in this example, less than 4) (step S69). If the number is not too small, control will return to step S51. If the number is too small, the parameters will be changed to those for smaller codes (in this example, codes with a code pitch of 50 μm) (step S70). Thereafter, the parameter decision flag MFLG will be reset at step S68, and control will return to step S51.

Even if the parameters have been decided, they can be reset at step S68. This makes it possible to read the codes correctly according to the changed magnification from the next and later frames, even if, for example, the size of codes changes as the frame advances during the code reading. The magnification may change between frames because the distance between the code of the subject and the reading camera changes, while codes are being read in a noncontacting manner.

In this example, the parameter decision flag MFLG is used to judge whether the parameters can be changed. When the flag is set, it is judged that the parameters have been decided, and the process of searching for more suitable parameters is not performed further. Use of the flag eliminates an unnecessary parameter decision process. By resetting the flag under certain conditions, the parameters can be reset.

In this example, even after the parameters have been decided, if an error has occurred in sensing markers and this has changed the parameters, the parameter decision flag MFLG will be reset. This enables the parameters decided after an error has occurred in sensing markers to be read as temporarily decided ones. When no error has occurred further in reading process by means of the temporarily decided parameters, the parameters are set and the parameter decision flag MFLG is set to decide the parameters at that time.

In this example, the marker sensing section 30 includes counting means for counting the number of marker candidates. The marker sensing section has the function of outputting an error signal according to the count result and outputs the count result when an error has occurred. When there is room in the area for storing information on the sensed marker candidates, it is possible to separate the counting means from the marker sensing section 30 to count after the marker sensing process has been completed. This eliminates the counting process during the marker sensing process, enabling the marker sensing process to be carried out at high speeds.

Figure 22:
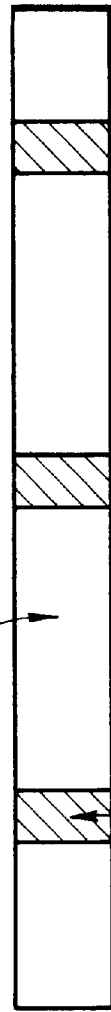
FIG. 22 is a drawing to help explain the recording positions of the system control file for setting other parameters.

As described earlier, the system control file disclosed in PCT/JP95/01467 shows the parameters necessary to each layer in the layer division of the information transfer protocol shown therein. The above-described dot size and block size are part of the parameters. Specifically, the dot size is a parameter necessary to layer 1 and the block size is a parameter necessary to layer 2. At an early stage, it is enough to know as many parameters as described above. As for the parameters necessary to the other layers, such as a modulation scheme, an error corrections scheme, or an expansion scheme, system control files are embedded in the dot codes as shown in FIG. 22, and from the embedded files, the parameters necessary to the other layers are retrieved.

In this case, a plurality of system control files having the same contents are recorded. The modulation scheme and the error correction scheme are recorded in the same form in all applications. This enables the contents of the system control files to be read and the parameter to be set in the sensed dot size by the predetermined schemes, which enables the information represented by the data dots 42 in the portions other than the system control files to be restored on the basis of the set parameters.

While in each of the above embodiments, the dot size and block size have been used as parameters, parameters used in the present invention include other types of parameters, such as those derived uniquely from the recognized dot size or the like, using a look-up table. For instance, parameters of one type are those for setting a period which are used in a circuit that emphasizes a signal of a dot period in the processing.

The present invention is not restricted to the embodiments described above, but may be practiced or embodied in still other ways without departing from the spirit or essential character thereof.

The gist of the present invention is as follows.

(1) An information reproduction system comprising: reading means for reading the codes by optical scanning from a recording medium on which multimedia information including at least one of audio information, image information, and text data has been recorded in the form of codes that can be read optically; processing means for processing the codes read by the reading means and restoring the multimedia information; output means for reproducing each piece of information on the basis of the output signal from the processing means and outputting the reproduced signal, the information reproduction system being characterized in that the processing means includes parameter setting means for setting the parameters necessary for the information reproduction system on the basis of physical information on the codes read by the reading means.

Because the parameters needed in reading codes and reproducing information are automatically set at the same time of reproduction, the operator does not have to set the parameters one by one. Therefore, it is possible to provide a user-friendly reproduction system with an improved operability.

(2) The information reproduction system in item (1) characterized in that each of the codes is an arrangement of blocks, each of which has data dots in specific units of them, the data dots being arranged so as to correspond to the multimedia information, the processing means has measuring means for measuring the size of the dot, and the parameter setting means sets the values of parameters (e.g., a dot size) on the basis of the size of the dot measured by the measuring means.

That is, the size measuring means is used in the system. The parameter is set, referring to only the output data from the measuring means.

(3) The information reproduction system in item (1) characterized in that each of the codes is an arrangement of blocks, each of which has data dots arranged so as to correspond to the multimedia information and marker for deciding a data dot reading reference point that are larger in size than the data dots and arranged in a specific positional relationship with the data dots, the processing means has marker sensing means for sensing the size of markers in the code, and the parameter setting means sets the values of parameters (e.g., a dot size) on the basis of the size of the markers.

Because the size of the marker 48 can be recognized at an early stage of the processing, the parameters can be set early.

(4) The information reproduction system in item (1) characterized in that each of the codes is an arrangement of blocks, each of which has dots arranged so as to correspond to the multimedia information, marker for deciding a data dot reading reference point that are larger in size than the data dots and arranged in a specific positional relationship with the data dots, and matching pattern dots that are arranged in a specific positional relationship with the data dots and marker and, together with the marker, decide the data reading reference point, the processing means has pattern dot sensing means for sensing the size of the matching pattern dots in the code, and the parameter setting means sets the values of parameters (e.g., a dot size) on the basis of the size of the matching dots.

That is, when the matching pattern dots have been formed so as to have the same size as that of the data dots, the dot size can be sensed very reliably.

(5) The information reproduction system in item (1) characterized in that each of the codes is an arrangement of blocks, each of which has dots arranged so as to correspond to the multimedia information, marker for deciding a data dot reading reference point that are larger in size than the data dots and arranged in a specific positional relationship with the data dots, and matching pattern dots that are arranged in a specific positional relationship with the data dots and marker and, together with the marker, decide the data reading reference point, the processing means has inter-dot distance sensing means for sensing the distance between dots in the matching pattern dots, and the parameter setting means sets the values of parameters on the basis of the distance between dots.

That is, even when the dot size have changed during the printing of dots, it is possible to compute a suitable dot size can always be computed, because the distance of dots is used.

(6) The information reproduction system in item (1) characterized in that each of the codes is an arrangement of blocks, each of which has data dots arranged so as to correspond to the multimedia information and marker for deciding a data dot reading reference point that are larger in size than the data dots and arranged in a specific positional relationship with the data dots, the reading means includes an imaging element having a specific image range and zooming means for varying the image range (magnification) in which the imaging element shoots, and the parameter setting means includes zooming control means for controlling the zooming means so that the number of the markers present in the image range of the imaging element and their size may have specific values.

Because the image range (magnification) is set automatically at the same time of reproduction in reading codes and reproducing information, the operator does not have to reset the image range (magnification) each time the code size changes. Therefore, it is possible to provide a user-friendly reproduction system with an improved operability.

(7) The information reproduction system in item (1) characterized in that each of the codes is an arrangement of blocks, each of which has data dots arranged so as to correspond to the multimedia information and marker for deciding a data dot reading reference point that are larger in size than the data dots and arranged in a specific positional relationship with the data dots, the processing means has inter-marker distance sensing means for sensing the distance between markers in the code, and the parameter setting means sets the values of parameters (e.g., a block size) on the basis of the distance between the markers.

Because the block size is determined from the distance between markers 48, data dots can be read. Item (7) has the advantage that the system control file for each layer can be written in data dots.

(8) The information reproduction system in item (1) characterized in that the reading means obtains an image in a plurality of fields by scanning an imaging element that shoots the code for each field requiring a specific shooting time, and the parameter setting means not only sets parameters (e.g., a dot size) on the basis of a first field image in which the dots shot by the imaging element exist, but also stores the values of the set parameters during the same code scanning period.

Because each parameter is set in the first field, the parameter setting from this time on is not necessary, improving the operability and shortening the processing time. Since the first field is particularly apt to get less active images, it is possible to sense a dot size more reliably.

The same code scanning period is generally the period between the time a single code starts to be scanned and the time the scanning is completed. In the present invention, the same code scanning period may be the period until the scanning of the code group containing a data group to be recognized as a single data item has been completed. For instance, when a single multimedia data item has been recorded in two codes, the same code scanning period in the invention means the period during which the two codes are being scanned.

(9) The information reproduction system in item (1) characterized in that each of the codes is an arrangement of blocks, each of which has data dots arranged so as to correspond to the multimedia information and marker for deciding a data dot reading reference point that are larger in size than the data dots and arranged in a specific positional relationship with the data dots, the processing means has marker sensing means for sensing the marker candidates in a single screen read by the reading means, and the parameter setting means sets the values of parameters on the basis of the error sensing result during the time when the marker sensing means are sensing marker candidates.

That is, the marker sensing process is the process first carried out in the code reading process. Because the optimum parameters can be set at a very early stage in the reading process by judging whether or not the parameters should be reset on the result of the marker sensing process, the number of erroneous data dots due to reading with inappropriate parameters can be reduced.

(10) The information reproduction system in item (1) characterized in that each of the codes is an arrangement of blocks, each of which has data dots arranged so as to correspond to the multimedia information and marker for deciding a data dot reading reference point that are larger in size than the data dots and arranged in a specific positional relationship with the data dots, the processing means has marker sensing means for sensing the marker candidates in a single screen read by the reading means and counting means for counting the number of the marker candidates sensed by the marker sensing means, and the parameter setting means sets the values of parameters on the basis of the number of marker candidates counted by the counting means.

Because the values of the parameters are set on the basis of the number of the sensed marker candidates, the problem that more markers than the memory capacity are sensed can be avoided.

(11) The information reproduction system in any one of the items (3), (4), (5), (7), (9) and (10) characterized in that the parameter setting means sets a marker sensing parameter for sensing markers.

That is, it is possible to lower the probability that data dots will be sensed mistakenly as marker candidates or dust be mistaken for a marker candidate.

(12) The information reproduction system in any one of the items (3), (4), (5), (7), (9), and (10) characterized in that the parameter setting means sets a marker search area parameter for searching for markers.

That is, narrowing the search range not only shorten the searching time, but also reduces the number of faulty markers sensed in the range due to dust or noise. Therefore, a burden on the processing thereafter can be alleviated.

(13) The information reproduction system in any one of the items (11) and (12) characterized in that the parameter setting means includes means for resetting the parameters when it has been judged that the parameters more suitable for reading the code can be set.

With this configuration, even when the code size changes during shooting as the frames advance in reading, such as when the magnification changes as a result of a change in the distance between the code of the subject and the reading camera in reading the codes in a noncontacting manner, the parameters can be set again according to the changed magnification so that the reading may be done properly from the next frame. This improves the reliability of the parameters.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reproduction system comprising:

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;

wherein said processing means includes parameter setting means for setting information reproduction parameters based on physical information on the codes read by said reading means;

wherein said reading means includes an imaging element having a specific image range in which said imaging element shoots, and zooming means for varying the image range; and wherein said parameter setting means includes zooming control means for controlling said zooming means so that a number of said markers present in the image range of said imaging element and a size of said markers have specific values.

2. An information reproduction system comprising;

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein said reading means includes an imaging element for obtaining an image in a plurality of fields by scanning said code for each field;

wherein said processing means includes parameter setting means for setting information reproduction parameters based on physical information on the codes read by said reading means; and wherein said parameter setting means sets the parameters based on a first field image in which the dots shot by said imaging element are present, and also stores values of the set parameters during a same code scanning period.

3. An information reproduction system comprising:

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;

wherein said processing means includes parameter setting means for setting information reproduction parameters based on physical information on the codes read by said reading means; and wherein said processing means also includes marker sensing means for sensing marker candidates in a single screen read by said reading means, and said parameter setting means sets values of the parameters based on an error sensing result during a time when said marker sensing means is sensing the marker candidates.

4. The information reproduction system according to claim 3, wherein said parameter setting means sets a marker sensing parameter for sensing markers.

5. An information reproduction system comprising;

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;

wherein said processing means includes parameter setting means for setting information reproduction parameters based on physical information on the codes read by said reading means;

wherein said processing means also includes marker sensing means for sensing marker candidates in a single screen read by said reading means, and counting means for counting a number of the marker candidates sensed by the marker sensing means; and wherein said parameter setting means sets the values of the parameters based on the number of marker candidates counted by said counting means.

6. The information reproduction system according to claim 5, wherein said parameter setting means sets a marker sensing parameter for sensing markers.

7. The information reproduction system according to claim 5, wherein said parameter setting means sets a marker search area parameter for searching for markers.

8. The information reproduction system according to claim 7, wherein said parameter setting means includes means for resetting the parameters when it has been judged that parameters more suitable for reading said code can be set.

9. An information reproduction system comprising:

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;

wherein said processing means includes parameter setting means for setting information reproduction parameters based on physical information on the codes read by said reading means;

wherein said processing means also includes measuring means for measuring a size of said dot; and wherein said parameter setting means sets a marker sensing parameter used for sensing markers based on the size of the dot measured by said measuring means.

10. An information reproduction system comprising:

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;

wherein said processing means includes parameter setting means for setting information reproduction parameters based on physical information on the codes read by said reading means;

wherein said processing means also includes measuring means for measuring a size of said dot; and wherein said parameter setting means sets a marker search area parameter used for searching for markers based on the size of the dot measured by said measuring means.

11. The information reproduction system according to claim 10, wherein said parameter setting means includes means for resetting the parameters when it has been judged that parameters more suitable for reading said code can be set.

12. An information reproduction system comprising:
reading means for optically scanning and reading codes recorded on a recording medium, said codes representing multimedia information including at least one of audio information, image information, and text data;
processing means for processing the codes read by the reading means to thereby restore the multimedia information; and
output means for reproducing the multimedia information based on an output signal from the processing means;
wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;
wherein said processing means includes parameter setting means for setting information reproduction parameters based on physical information on the codes read by said reading means;
wherein said processing means also includes measuring means for measuring a size of the markers; and
wherein said parameter setting means sets a marker sensing parameter used for sensing markers based on the size of the markers measured by the measuring means.

13. An information reproduction system comprising:
reading means for optically scanning and reading codes recorded on a recording medium, said codes representing multimedia information including at least one of audio information, image information, and text data;
processing means for processing the codes read by the reading means to thereby restore the multimedia information; and
output means for reproducing the multimedia information based on an output signal from the processing means;
wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;
wherein said processing means includes parameter setting means for setting information reproduction parameters based on physical information on the codes read by said reading means;
wherein said processing means also provides marker measuring means for sensing a size of markers; and
wherein said parameter setting means sets a marker search area parameter used for searching markers based on the size of the markers measured by the measuring means.

14. The information reproduction system according to claim 13, wherein said parameter setting means includes means for resetting the parameters when it has been judged that parameters more suitable for reading said code can be set.

15. An information reproduction system comprising:
reading means for optically scanning and reading codes recorded on a recording medium, said codes representing multimedia information including at least one of audio information, image information, and text data;
processing means for processing the codes read by the reading means to thereby restore the multimedia information; and
output means for reproducing the multimedia information based on an output signal from the processing means;
wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;
wherein said processing means includes parameter setting means for setting information reproduction parameters based on physical information on the codes read by said reading means;
wherein said processing means also includes measuring means for measuring a size of matching pattern dots; and
wherein said parameter setting means sets a marker sensing parameter used for sensing markers based on the size of the matching pattern dots measured by the measuring means.

16. An information reproduction system comprising:
reading means for optically scanning and reading codes recorded on a recording medium, said codes representing multimedia information including at least one of audio information, image information, and text data;
processing means for processing the codes read by the reading means to thereby restore the multimedia information; and
output means for reproducing the multimedia information based on an output signal from the processing means;
wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;
wherein said processing means includes parameter setting means for setting information reproduction parameters based on physical information on the codes read by said reading means;
wherein said processing means also includes measuring means for measuring a size of matching pattern dots; and
wherein said parameter setting means sets a marker search area parameter used for searching for markers based on the size of said matching pattern dots measured by the measuring means.

17. The information reproduction system according to claim 16, wherein said parameter setting means includes means for resetting the parameters when it has been judged that parameters more suitable for reading said code can be set.

18. An information reproduction system comprising:
reading means for optically scanning and reading codes recorded on a recording medium, said codes representing multimedia information including at least one of audio information, image information, and text data;
processing means for processing the codes read by the reading means to thereby restore the multimedia information; and
output means for reproducing the multimedia information based on an output signal from the processing means;
wherein each of said codes comprises an arrangement of blocks, each block having: (i) dots arranged so as to correspond to said multimedia information, (ii) markers for determining a data dot reading reference point, said markers being larger in size than the data dots and being arranged in a specific positional relationship with respect to the data dots, and (iii) matching pattern dots arranged in a specific positional relationship with respect to said data dots and the markers;

wherein said processing means includes parameter setting means for setting information reproduction parameters based on physical information on the codes read by said reading means;

wherein said processing means also includes inter-dot distance measuring means for measuring a distance between dots in said matching pattern dots; and wherein said parameter setting means sets a marker sensing parameter used for sensing markers based on the distance between dots measured by the inter-dot distance measuring means.

19. An information reproduction system comprising:

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having: (i) dots arranged so as to correspond to said multimedia information (ii) markers arranged in a specific positional relationship with respect to the data dots, said markers being larger in size than the data dots, and (iii) matching pattern dots arranged in a specific positional relationship with respect to said data dots and the markers, said matching pattern dots and said markers together determining a data reading reference point;

wherein said processing means includes parameter setting means for setting information reproduction parameters based on physical information on the codes read by said reading means;

wherein said processing means also includes inter-dot distance measuring for measuring a distance between dots in said matching pattern dots; and wherein said parameter setting means sets a marker search area parameter used for searching for markers based on the distance between dots measured by the inter-dot distance measuring means.

20. The information reproduction system according to claim 19, wherein said parameter setting means includes means for resetting the parameters when it has been judged that parameters more suitable for reading said code can be set.

21. An information reproduction system comprising:

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;

wherein said processing means includes parameter setting means for setting information reproduction parameters based on physical information on the codes read by said reading means;

wherein said processing means also includes inter-marker distance measuring means for measuring a distance between markers in said code; and wherein said parameter setting means sets a marker sensing parameter used for sensing markers based on the distance between the markers measured by the inter-marker distance measuring means.

22. An information reproduction system comprising:

reading means for optically scanning and reading codes recorded on a recording medium, said codes representing multimedia information including at least one of audio information, image information, and text data;

processing means for processing the codes read by the reading means to thereby restore the multimedia information; and output means for reproducing the multimedia information based on an output signal from the processing means;

wherein each of said codes comprises an arrangement of blocks, each block having data dots arranged so as to correspond to said multimedia information and markers for determining a data dot reading reference point, said markers being larger in size than the data dots and being arranged in a specific positional relationship with respect to the data dots;

wherein said processing means includes parameter setting means for setting information reproduction parameters based on physical information on the codes read by said reading means;

wherein said processing means also includes inter-marker distance measuring means for measuring a distance between markers in said code; and wherein said parameter setting means sets a marker search area parameter used for searching for markers based on the distance between the markers measured by the inter-marker distance measuring means.

23. The information reproduction system according to claim 22, wherein said parameter setting means includes means for resetting the parameters when it has been judged that parameters more suitable for reading said code can be set.

* * * * *